UNITED STATES PATENT OFFICE.

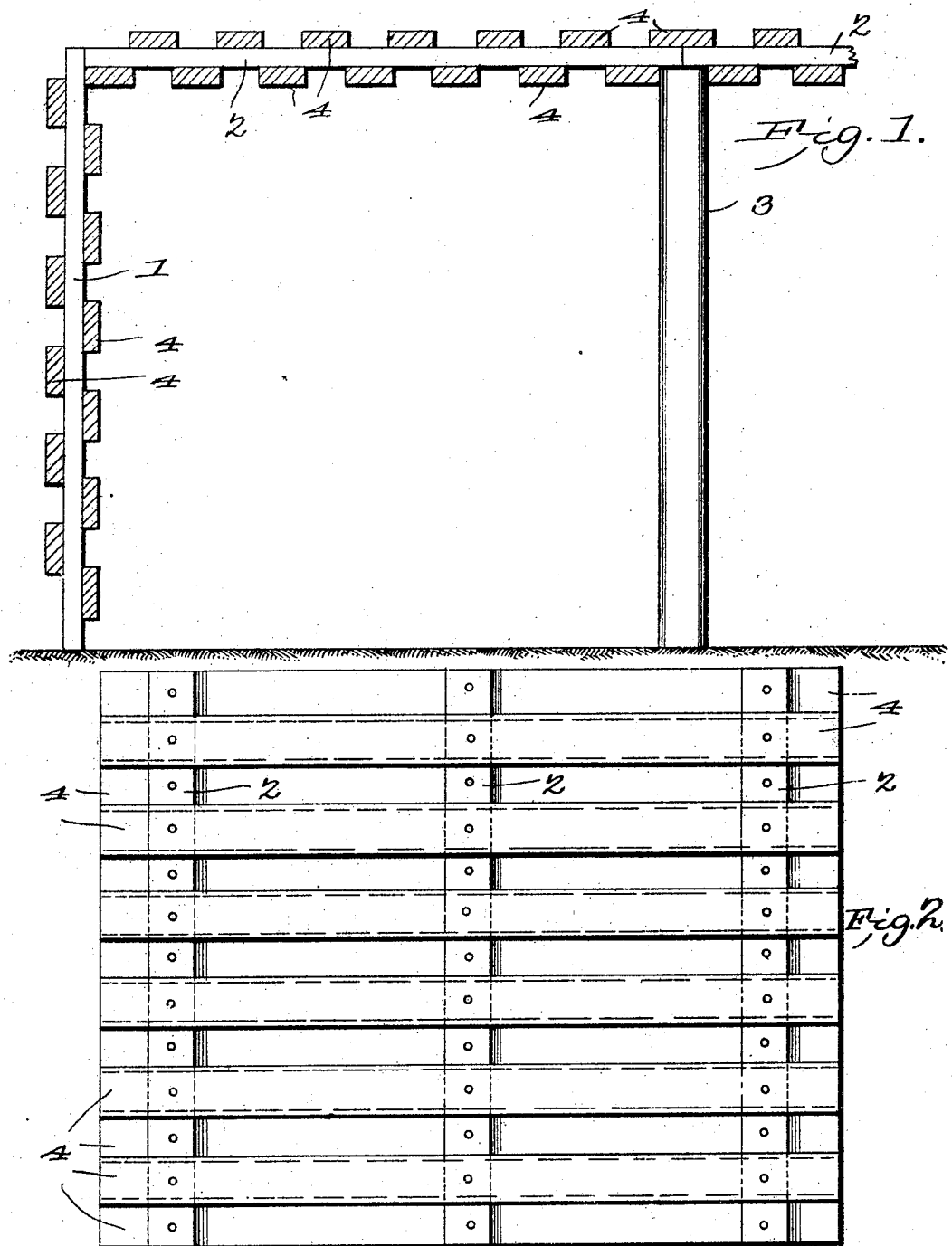

HARRY D. SHIMER, OF MUSKEGON, MICHIGAN, ASSIGNOR TO MUSKEGON GINSING CO., OF MUSKEGON, MICHIGAN.

ARTIFICIAL SHADING FOR GARDENING.

No. 796,461.     Specification of Letters Patent.     Patented Aug. 8, 1905.

Application filed January 26, 1905. Serial No. 242,760.

*To all whom it may concern:*

Be it known that I, HARRY D. SHIMER, a citizen of the United States, residing at Muskegon, in the county of Muskegon and State of Michigan, have invented a new and useful Artificial Shading for Gardening, of which the following is a specification.

This invention relates to artificial shading for gardening.

The object of the invention is to provide a shading adapted more particularly for use in ginseng gardening, which shall be simple in construction, easily manufactured, durable and efficient in use, and thoroughly effective in shielding the plants from the direct rays of the sun and also from the destructive effects of rain and hail.

As is well known in the cultivation of ginseng, in order that the roots shall be brought to maturity rapidly and effectively it is necessary that the plants shall be subjected to plenty of light and air and be shielded from the direct rays of the sun, especially at midday, as the heat therefrom is destructive to the plants and will prevent them from properly maturing. The shading now generally in use for this purpose is constructed of laths or narrow strips nailed to suitable uprights and roof-timbers, with suitable spaces between them to permit entrance of light; but owing to the fact that there is nothing to intercept the direct rays of the sun these at noonday shine directly upon the plants and injure them. Furthermore, there is nothing to intercept the descent of rain or hail, and these two forces of nature are always detrimental and frequently fatal to the plants.

As will hereinafter appear, by the novel construction of shading constituting this invention an abundance of light and air is furnished to plants, but they are positively shielded from the direct rays of the sun and also from the direct action of hail and rain.

With the above and other objects in view, as will appear as the nature of the invention is better understood, the same consists in the novel construction and combination of parts of an artificial shading for gardening purposes, as will be hereinafter fully described and claimed.

In the accompanying drawings, forming a part of this specification, and in which like characters of reference indicate corresponding parts, there are illustrated two forms of embodiment of the invention each capable of carrying the same into practical operation, it being understood that the elements therein exhibited may be varied or changed as to shape, proportion, and exact manner of assemblage without departing from the spirit thereof.

In the drawings, Figure 1 is a view in elevation, partly in section, exhibiting a portion of a building constructed in accordance with the present invention. Fig. 2 is a view in side elevation of a section of the shading. Fig. 3 is a sectional detail view of a portion of a slightly-modified form of shading.

The uprights and roof-timbers may be of any desired thickness and spaced at any distance apart and have nailed on each side thereof strips or laths 4, which are arranged in break-joint order, so that the strips on one side of the uprights or roof-timbers will cover the space between a pair of strips on the other side of the uprights or roof-timbers, and by this arrangement it will be seen that no matter what the angle of the sun may be relative to the sides and roof of the structure there is no time when the direct sun-rays will be thrown upon the ground, and at noonday when the sun is the hottest, at which time it is most necessary to shield the plants, the sun-rays are absolutely precluded. Moreover, by the arrangement of the strips as described the descent of rain or hail will be checked and will only drop a distance equal to the height of the roof, so that the destruction of the plants which would otherwise result from the beating of the rain or hail will be prevented. The sheathing, which will be composed of the intermediate battens or spacing elements 1 and 2 and of strips 4, may be built in sections, as shown in Fig. 2, and these may be shipped and set up, or if preferred the uprights and roof-timbers may be raised as in an ordinary house and the strips 4 be properly secured thereto.

Instead of having strips disposed on opposite sides of the spacing elements, as shown in Figs. 1 and 2, they may be disposed on but one side thereof, as shown in Fig. 3, in which the spacing element is designated by 5 and the strips by 6, and the edges of these strips will be oppositely beveled and chamfered, as at 7, and the beveled edges will be overlapped, thereby operating in the same manner as the double strips shown in Figs. 1 and 2 to prevent the direct entrance of the sun's rays and also to check the descent of rain or hail.

The structure as a whole will be exceedingly light, and owing to the simplicity of construction damages may be readily and cheaply repaired without necessitating the employment of skilled labor for the purpose.

Having thus described the invention, what is claimed is—

An artificial shading comprising relatively thin supporting members, and spaced shading elements rigidly secured upon each side thereof and of greater width than the spaces between them, thereby to preclude direct entrance of light-rays.

In testimony that I claim the foregoing as my own I have hereto affixed my signature in the presence of two witnesses.

HARRY D. SHIMER.

Witnesses:
 WILFRED E. DUQUETTE,
 LEWIS J. BROWN.